US008931152B2

(12) United States Patent
Parente et al.

(10) Patent No.: US 8,931,152 B2
(45) Date of Patent: Jan. 13, 2015

(54) WEDGE INSTALLATION AND SEATING TOOL AND METHOD OF USE

(76) Inventors: Ralph A. Parente, Cleveland, OH (US); Neil Casto, Canton, OH (US)

( * ) Notice: Subject to any disclaimer, the term of this patent is extended or adjusted under 35 U.S.C. 154(b) by 144 days.

(21) Appl. No.: 13/449,400

(22) Filed: Apr. 18, 2012

(65) Prior Publication Data

US 2012/0266441 A1 Oct. 25, 2012

Related U.S. Application Data

(60) Provisional application No. 61/477,392, filed on Apr. 20, 2011.

(51) Int. Cl.

| | |
|---|---|
| ***B23P 19/04*** | (2006.01) |
| ***E04B 1/00*** | (2006.01) |
| ***B25B 27/00*** | (2006.01) |
| ***E04G 21/12*** | (2006.01) |
| *B25B 33/00* | (2006.01) |

(52) U.S. Cl.

CPC ................ *B25B 27/00* (2013.01); *E04G 21/12* (2013.01); *B25B 33/00* (2013.01)

USPC ............................................ 29/253; 52/741.1

(58) Field of Classification Search

CPC .......... E04G 21/00; B25B 27/00; B25B 33/00

USPC ........ 29/253, 428, 270, 281.1, 255, 280, 278, 29/452; 81/487, 488, 44, 177.6, 177.7

See application file for complete search history.

(56) References Cited

U.S. PATENT DOCUMENTS

| | | | | |
|---|---|---|---|---|
| 768,161 | A * | 8/1904 | Thompson | 7/131 |
| 6,240,699 | B1 | 6/2001 | Scanlon et al. | |
| 2010/0037442 | A1* | 2/2010 | Branon | 29/221.6 |
| 2011/0162173 | A1* | 7/2011 | Ciminski et al. | 24/303 |

* cited by examiner

*Primary Examiner* — Lee D Wilson
*Assistant Examiner* — Seahee Yoon
(74) *Attorney, Agent, or Firm* — Buckingham, Doolittle & Burroughs, LLC

(57) ABSTRACT

A wedge installation and seating tool and associated method of operation that permits a worker to single handedly and expeditiously install and seat wedges in an anchor assembly of a post tensioned concrete member, thereby improving worker safety and productivity. In a preferred embodiment, the tool is an elongated member comprised of two body portions hingedly attached to one another for substantially surrounding the circumference of a reinforcing cable used in an anchor assembly of a post tensioned concrete member, and a wedge retention means for temporarily attaching the wedges to the tool. The tool and method of the present invention effectively eliminates the need for a separate seating tool, and the tool is relatively inexpensive to manufacture and is easy to use.

13 Claims, 5 Drawing Sheets

WEDGE INSTALLATION AND SEATING TOOL AND METHOD OF USE

CROSS-REFERENCE

This application claims priority from Provisional Patent Application Ser. No. 61/477,392 filed on Apr. 20, 2011.

FIELD OF THE INVENTION

This invention relates to a tool for safely installing and seating wedges in an anchoring block of a post tensioned concrete structure with a single hand, and a method of installation.

BACKGROUND

Reinforced concrete structures are well known in the art, and are used in a wide variety of applications including, without limitation, buildings, bridges, parking decks and other structures constructed of concrete. Many of these types of structures are comprised of post-tensioned concrete in which steel cables are stressed within the concrete member after the concrete has been poured and hardened. More specifically, prior to pouring the concrete, anchors are set and attached to the concrete form in such a manner that the anchors will be embedded in the concrete after it is poured and hardens and the forms are removed. Because the anchors are typically embedded within the member and not otherwise accessible once the concrete is poured, pocket formers are used to form a void or anchor cavity for accessing the anchors from the ends of the member after the concrete is poured. After the concrete is poured and hardens, the pocket formers are removed thereby leaving anchor cavities within the ends of the concrete member for accessing the anchors. As explained more fully below, the anchors have tapered wedge-receiving seats and passages through which the cables extend.

Prior to pouring the concrete, steel cables are also installed, preferably within polyethylene sheathing, inside the concrete forms that are used to form the concrete member. Inasmuch as concrete members typically exhibit desirable compression characteristics but undesirable tensile characteristics, the steel cables and associated sheathing are typically placed in the tensile zone of a concrete member to add strength thereto. As noted above, the steel cables extend through openings in the anchors and initially extend beyond the ends of the concrete member. The concrete is then poured into the concrete form, and permitted to harden to a specific design strength. As described more fully below, tapered wedges are also installed and partially seated in the tapered wedge-receiving seat of each anchor on each side of the reinforcing cable.

After the concrete has sufficiently hardened, a hydraulic jack or stressing ram is used to pull or tension the steel cables that extend outwardly from the anchors to a desired pressure and elongation. The presence of the sheathing allows the steel cables to move relative to the concrete. Therefore, the steel cables can be stressed without frictional resistance from the concrete, which effectively eliminates or reduces the tensile stresses in the concrete due to the stressing. While stressed, the steel cables are permanently attached to the anchors at the ends of the concrete structure through the use of the aforementioned wedges. In this manner, the tensile forces in the steel cables are permanently transferred to the concrete as a compressive force through the anchorage assemblies located at the ends of the concrete member.

More specifically, the wedges are driven into the space between the cable and the surrounding anchor that is known as the wedge-receiving seat. In a two piece wedge system, the wedges are preferably semi-cylindrical, tapered pieces of metal with teeth or other markings on their interior surface for clamping or biting into the cable as the stressing ram releases the cable, thereby preventing the cable from slipping back through the anchor and into the sheathing encased in the concrete member. Once all of the cables have been properly stressed, the ends of the cables are cut so that they no longer extend beyond the concrete member, the anchor pockets are grouted, and the ends of the concrete structure are encapsulated to protect the cables from the elements. While two piece wedge systems are used for most projects involving monostrand or multi-strand cables, three piece wedge systems are also known in the art and used in certain applications.

Failure to properly install and seat the wedges within the anchor may result in damage or failure of the cables and/or the concrete member, which decreases productivity and may also result in severe injury or death. Nonetheless, it can be challenging to properly align, install and seat the wedges within the anchor assembly. More specifically, given the matrix of cables typically involved, limited work space, and lack of line of sight, it can be difficult and time consuming for a worker to properly position himself to align, install and seat the wedges within the anchor. Furthermore, the difficult task of installing and seating wedges in a limited work environment with a limited line of sight into the anchor cavity is further complicated by the fact that this work is oftentimes accomplished by hand and/or with the use of bulky and elongated handheld tools such as the one disclosed in U.S. Pat. No. 6,240,699 to Scanlon, et. al.

For example, when the wedges are installed by hand, the installer must attempt to insert both wedges into the wedge receiving seat between the cable and the surrounding anchor at the same time and at the proper orientation, all while maneuvering/straddling a matrix of cables in a confined work environment. More specifically, proper installation of the wedges requires that the wedges be installed on each side of the cable such that the gaps between the two wedges are located at the twelve-o'clock and six-o'clock positions. This is oftentimes difficult for the worker to accomplish, as the worker typically cannot see into the anchor cavity created by the pocket-former and/or there may be other objects (e.g., cables, etc.) in the line of sight. This problem is particularly acute when the concrete member receiving the wedges is a beam, which could have thirty-six or more cables that need to be anchored and stressed within a confined space. Moreover, because the worker must use both hands to simultaneously insert the wedges into the space, the worker is not able to utilize one of his hands to secure himself to the work platform, which could result in the worker losing his balance and/or becoming injured. Additionally, even after a worker successfully inserts the wedges into the space, the worker must then use a prior art device, such as an elongated handheld ram, to partially seat said wedges within the anchor assembly, which can also be time consuming as well as frustrating.

Similar limitations and difficulties exist with respect to the device described in the '699 patent, which also requires the worker to use two hands to properly install and partially seat the wedges within the wedge receiving seat of the anchor. More specifically, the '699 patent discloses an elongated device in which the worker must first magnetically attach the wedges to one end of the device, and then position the device adjacent to the cable. The worker must then apply a longitudinal force to the device and the magnetically attached wedges along the cable and in the direction of the anchor cavity to partially install the wedges in the anchor, all of which must be accomplished without breaking the magnetic connection between the device and the wedges. If the magnetic connection is broken, the wedges will fall from the device and need to be retrieved before the process can be started anew. Once the wedges are partially installed in the anchor cavity, the worker is then required to use his or her other hand to repeatedly and reciprocally slide the hammer member along the shaft of the device to pound the wedges into place, all while supporting the weight of the overall device with the worker's first hand. Because the operation of the device requires the worker to use both of his hands, the worker is unable to use one of his hands to properly secure himself to the work platform, the failure of which could lead to serious injury or even death.

Moreover, given the overall size of the device taught by the '699 patent and the range of motion required to operate the device with two hands (i.e., one hand on the device and one hand on the sliding hammer portion), the device is difficult to use in most limited work environments in which wedges must be installed in an anchor cavity. Additionally, as previously mentioned, when using the device disclosed in the '699 patent, the wedges tend to become prematurely separated from the tip of the device if the magnetic attraction is broken (e.g., if the wedges are bumped against the cable or other structure prior to installation) before the wedges are installed in the anchor. If the magnetic connection is broken, the wedges will fall from the device and need to be retrieved before the process can be started anew, which can be both time-consuming and frustrating.

Consequently, there exists in the art a long-felt need for a device or tool that enables a user to safely and properly install and seat wedges in an anchor assembly of a post tensioned concrete structure with a single hand, thereby freeing up the user's other hand. There is also a long-felt need for a device or tool that releasably secures the wedges to the tool until the same are properly installed in the wedge receiving seat of the anchor assembly. Additionally, there is a long felt need in the art for a single device or tool that properly installs and seats wedges in a post-tensioned concrete member, thereby eliminating the need for a separate seating tool which not only saves time but also reduces construction costs. There is also a long felt need for a quicker method of installing wedges in a post-tension concrete member that results in significant time, labor and cost savings, while also reducing the risk or likelihood of injury or death of the worker. Finally, there is a long-felt need for a device and method that accomplishes all of the forgoing objectives, and that is relatively inexpensive to manufacture, and easy to use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, is a tool for properly installing and seating multiple wedges in a space between an anchor and a reinforcing cable extending through said anchor comprising an elongated member, wherein said elongated member is further comprised of two body portions hingedly attached to one another for substantially surrounding the circumference of a reinforcing cable, and a wedge retention means for temporarily attaching the wedges to the tool. As another important aspect of the present invention, the tool is useful for properly installing and seating wedges in an anchor assembly of a post tensioned concrete member through the following steps: (a) temporarily installing one or more of said wedges on the tool and wrapping the tool substantially around the circumference of a reinforcing cable; (b) applying a longitudinal force to said tool along said reinforcing cable in a direction towards said anchor assembly; (c) sliding said tool along said reinforcing cable in a direction away from said anchor assembly; and (d) repeating steps (b) and (c) until said wedges are partially seated in the anchor assembly.

The wedge installation and seating tool and associated method of operation permit a worker to single handedly and expeditiously install wedges in an anchor assembly of a post tensioned concrete member, thereby improving worker safety and productivity. Moreover, the tool and method of the present invention effectively eliminates the need for a separate seating tool, which also reduces project costs and improves productivity. Finally, the wedge installation and seating device of the present invention is relatively inexpensive to manufacture, and is easy to use.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
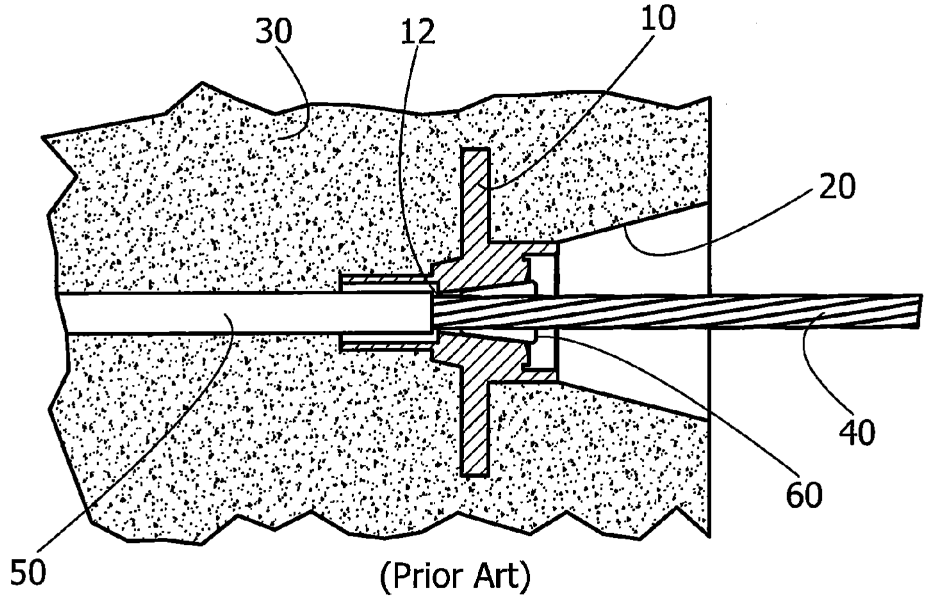
(Prior Art) FIG. 1
FIG. 1 illustrates a cross-sectional view of a portion of a prior art post tensioned concrete member with wedges properly installed in an anchor installed therein.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details.

The wedge installation and seating tool and associated method of the present invention permits a worker to safely and properly install and seat wedges in an anchoring block of a post tensioned concrete structure with a single hand, thereby freeing up the user's other hand. In turn, the worker can use his free hand to secure himself to the structure, thereby increasing safety and reducing the likelihood of injury. The wedge installation and seating device and associated method of the present invention also significantly reduce the amount of time that it takes to install and seat wedges in an anchoring block of a post tensioned concrete structure, thereby increasing the efficiency of the labor force and reducing overall project costs. Additionally, the tool is relatively inexpensive to manufacture, and is easy to use.

Figure 1A:
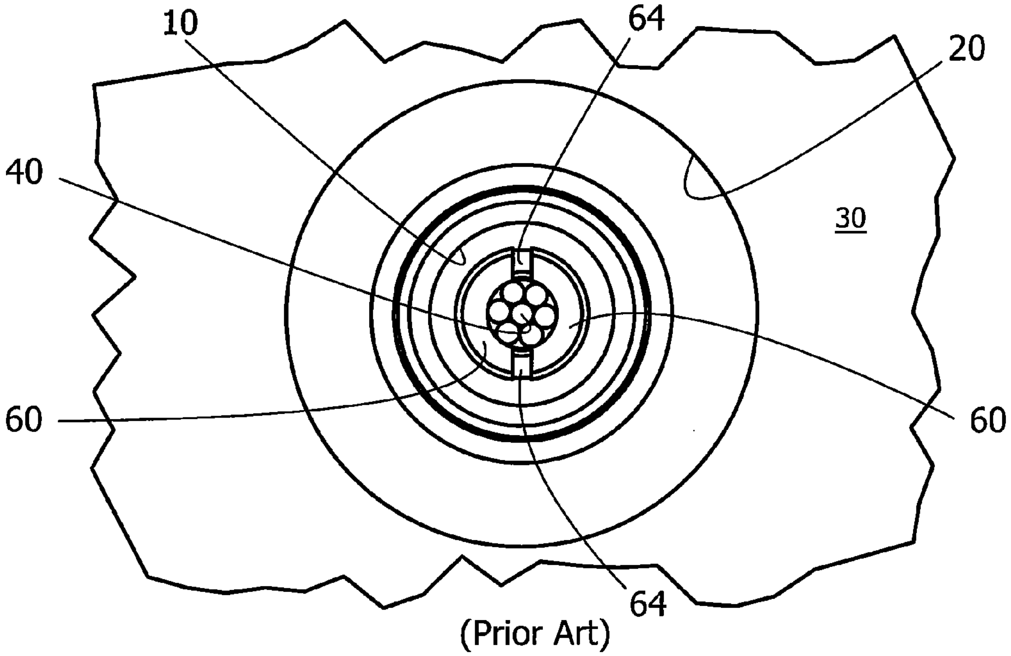
(Prior Art) FIG. 1A
FIG. 1A illustrates a partial front elevational view of the prior art post tensioned concrete member depicted in FIG. 1.

By way of background and referring initially to the drawings, FIG. 1 illustrates a partial cross-sectional view of a prior art anchor assembly 10 installed in an anchor cavity 20 of a concrete member 30. A reinforcing cable 40 extends through a section of sheathing 50 with a continuous opening therein (not shown), which is embedded in concrete member 30, and through a continuous opening 12 in anchor assembly 10. A pair of semi-cylindrical, tapered wedges 60 are used to prevent reinforcing cable 40 from slipping back through opening 12 in anchor assembly 10 after the cable 40 is stressed with a hydraulic ram (not shown). The inner surface of the prior art wedges 60 are comprised of teeth or relatively small ridges or other markings (not shown) for gripping the exterior surface of reinforcing cable 40 after cable 40 is stressed. More specifically, prior to the stressing of cable 40 by a jack or a ram (not shown), the tapered portion of each of wedges 60 is partially inserted into a space or wedge receiving seat (not shown) that exists between the outer surface of reinforcing cable 40 and the inner surface of opening 12 in such a manner that, in a two wedge system, wedges 60 are on opposite sides of cable 40 and gaps 64 exists between wedges 60 at the roughly twelve-o'clock and six-o'clock positions, as best illustrated in FIG. 1A.

After the wedges 60 are installed and partially seated in anchor 10, a prior art hydraulic jack or ram (not shown) pulls or stresses cable 40 in a direction away from concrete member 30, while also further seating wedges 60 in anchor assembly 10. Once all of the cables 40 have been properly stressed, the ends of cables 40 are cut, the anchor cavities 20 are grouted, and the ends of the concrete member 30 are encapsulated to protect cables 40 from the elements.

However, as previously mentioned, it is both difficult and time consuming to properly install and seat wedges 60 in anchor assembly 10 by hand or with the use of known prior art devices such as the one taught by the '699 patent. Moreover, these prior art devices and techniques of installing and seating wedges 60 in anchorage assembly 10 also require the worker to use both of his hands, which can be dangerous and result in injury to the worker and lost productivity. Therefore, there exists in the art a long-felt need for a device that enables a user to safely and properly install and seat wedges 60 in an anchor assembly 10 of a post tensioned concrete structure 30 with a single hand, and without the need for a separate wedge seating tool. There is also a long felt need for a quicker method of installing wedges 60 in a post-tension concrete member 30 that results in significant time, labor and cost savings, which also reducing the risk or likelihood of injury or death of the worker.

Figure 2:
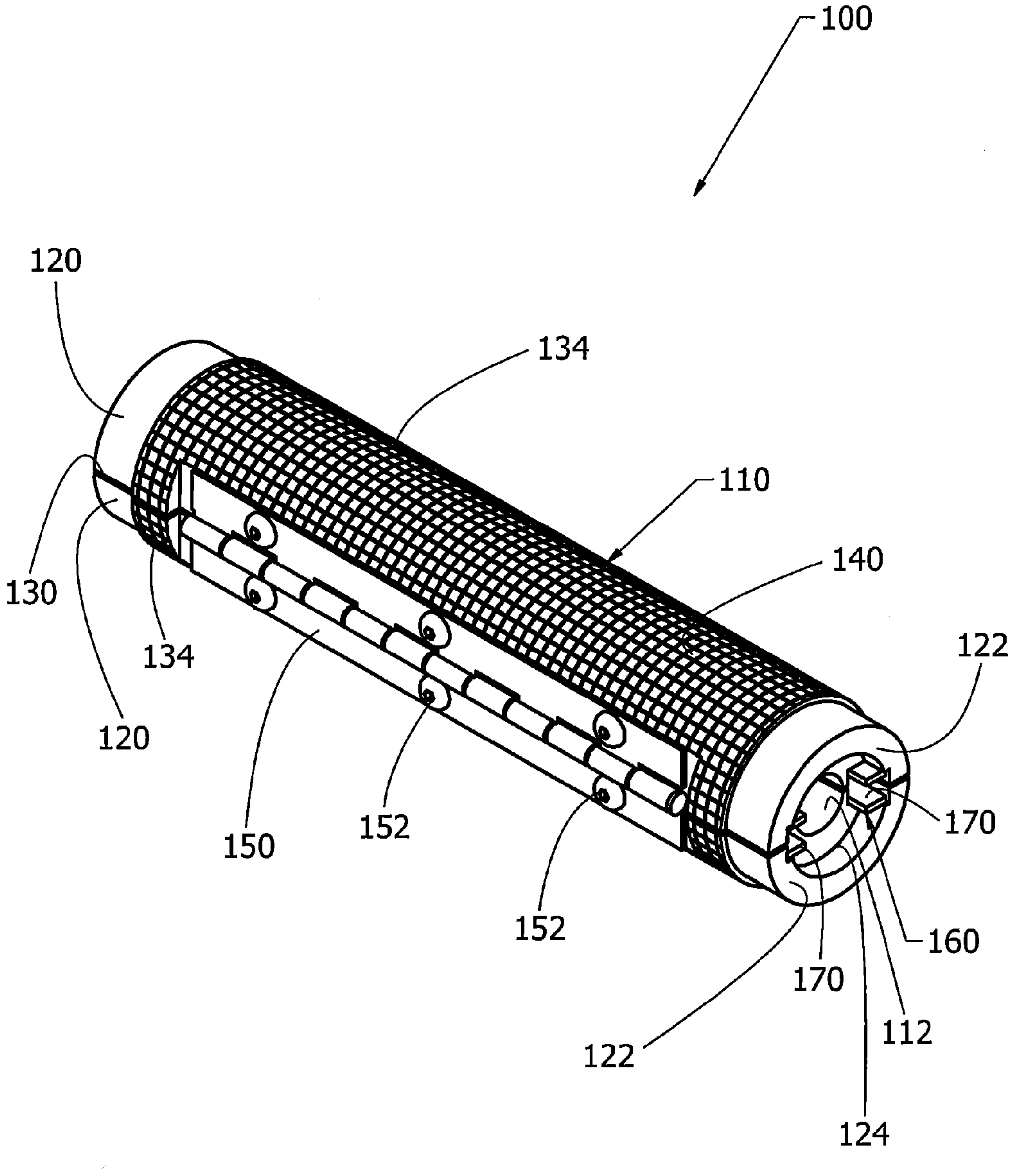
FIG. 2 illustrates a perspective view of one embodiment of the tool of the present invention in a closed position.

Having now described the general structure of a post tensioned concrete member, the wedge installation and seating tool 100 of the present invention will now be described. FIG. 2 illustrates a perspective view of one embodiment of the wedge installation and seating tool 100 of the present invention in a closed position. Tool 100 preferably comprises a substantially cylindrical elongated member 110 and a wedge retention means 160 for temporarily attaching wedges 60 to tool 100. Unless otherwise stated, elongated member 110 is preferably comprised of a durable material, such as AISI 1045 grade steel, though it is contemplated that elongated member 110 can also be comprised of other durable materials and/or other tool grades of steel without affecting the overall concept of the present invention. Further, while elongated member 110 is preferably substantially cylindrical in shape for easy handling as discussed more fully below, it is also contemplated that elongated member 110 can also be comprised of various other geometric and non-geometric shapes.

Figures 3, 3A:
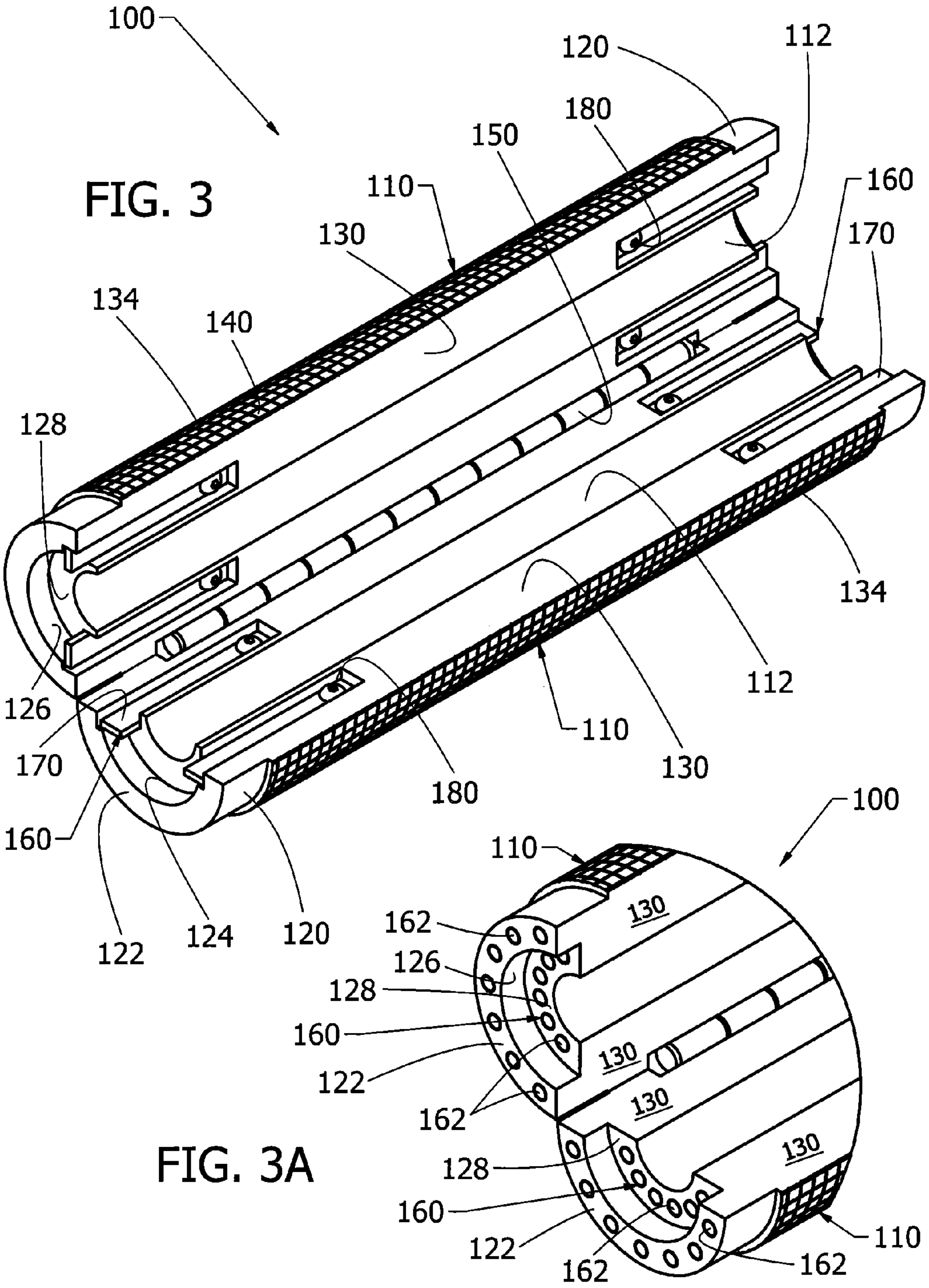
FIG. 3 illustrates a perspective view of the tool depicted in FIG. 2 in an open position.
FIG. 3A illustrates a perspective view of the tool depicted in FIG. 2 in an open position with magnets.

As best illustrated in FIG. 3, which is a perspective view of the wedge installation and seating tool 100 of FIG. 2 in an open position, elongated member 110 is further comprised of two elongated body portions 120, hingedly attached to one another by a hinge 150. Inasmuch as each of body portions 120 are substantially similar in shape, structure, and dimension in a preferred embodiment of the present invention, only one of body portions 120 will now be described in detail.

Figure 5:
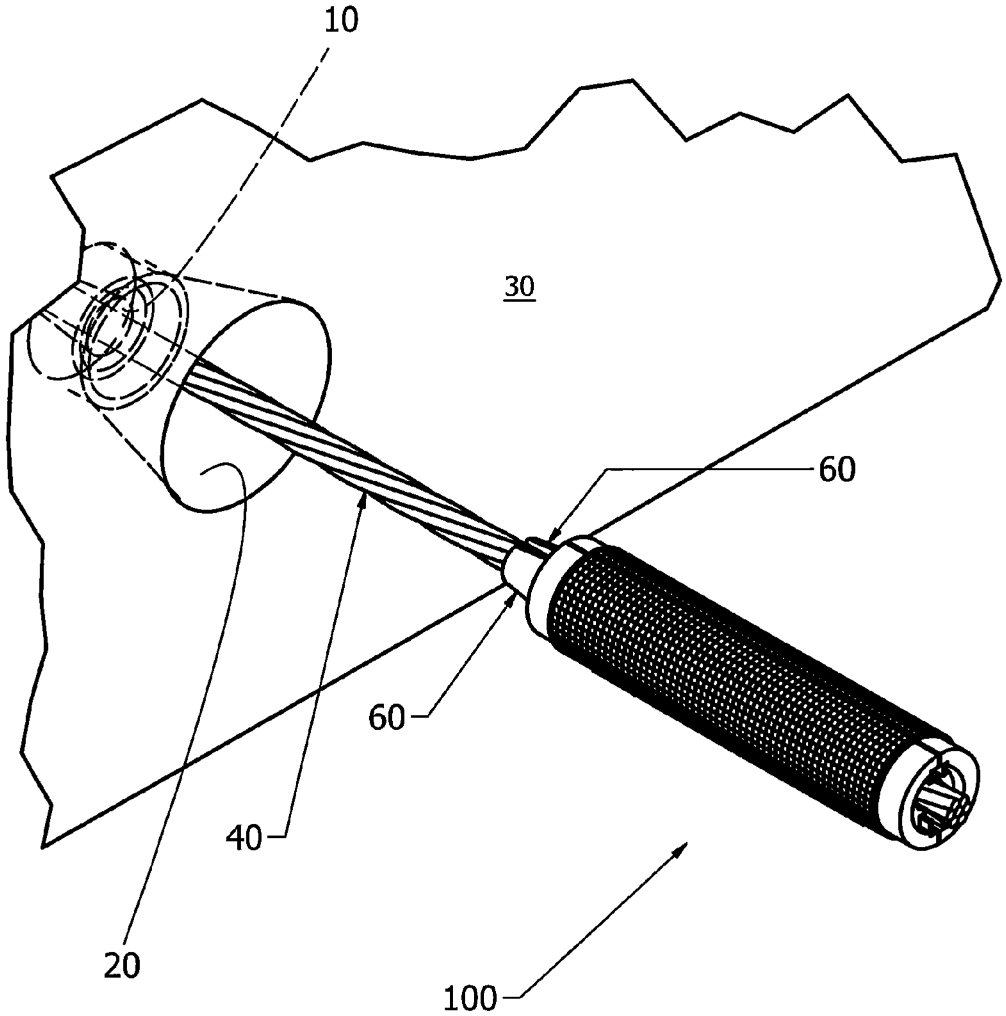
FIG. 5 illustrates a perspective view of the tool depicted in FIG. 2 with prior art wedges temporarily installed thereon engaging a length of prior art cable.

In a preferred embodiment of the present invention in which tool 100 is substantially cylindrical in shape when in a closed position, as depicted in FIG. 2, body portion 120 is elongated and substantially semi-cylindrical in shape and comprised of end portions 122, an interior surface 130 and exterior surface 134. As depicted in FIG. 3, interior surface 130 further comprises a continuous generally semi-cylindrical bore or opening 112 therein for receipt of cable 40. More specifically, when tool 100 is in the closed position as shown FIG. 2, the semi-cylindrical opening 112 of each body portion 120 join together to form a continuous and generally cylindrical opening 112 in tool 100 for receipt of cable 40 as shown in FIG. 5. Opening 112 is preferably between ½ and ¾ of an inch in diameter to accommodate a cable 40 with an approximate diameter of ½ inch, and to permit tool 100 to be slidably repositioned along cable 40 during the wedge installation and seating process, as described more fully below. Nonetheless, it is also contemplated that the diameter of opening 112 can be larger or smaller to accommodate different sized cables (e.g., reinforcing cables with a diameter of ⅝ of an inch) without affecting the overall concept of the present invention.

As depicted in FIG. 3, exterior surface 134 may further comprise a handle portion 140 for improving a worker's (not shown) grip on tool 100. Handle portion 140 may be formed by scoring or texturing the exterior surface 134 of the tool 100 as shown in FIG. 2. Alternatively, any handle commonly known in the art for use in connection with a handheld device or tool (e.g., a rubber handle) may be attached to exterior surface 134 by any means commonly known in the art, provided that the same does not unduly interfere with the opening, closing and/or use of tool 100.

As previously mentioned and depicted in the various FIGS., each of body members 120 are hingedly attached to one another by a hinge 150. Hinge 150 can be any internal or external hinge generally known in the art, provided that the same doesn't unduly interfere with the opening, closing and/or use of tool 100, as described more fully below. In a preferred embodiment of the present invention depicted in FIG. 2, body members 120 are hingedly attached to one another by an external hinge 150 that is attached to the exterior surface 134 of each of body members 120 through the use of fasteners such as screws 152. Nonetheless, it is contemplated that other types of hinges 150 and hinge arrangements can also be utilized without affecting the overall concept of the present invention. For example, it is contemplated that an internal hinge 150 could be countersunk into the interior surface 130 of each of body members 120, and used to hingedly attach each of body members 120 to one another.

Figure 4:
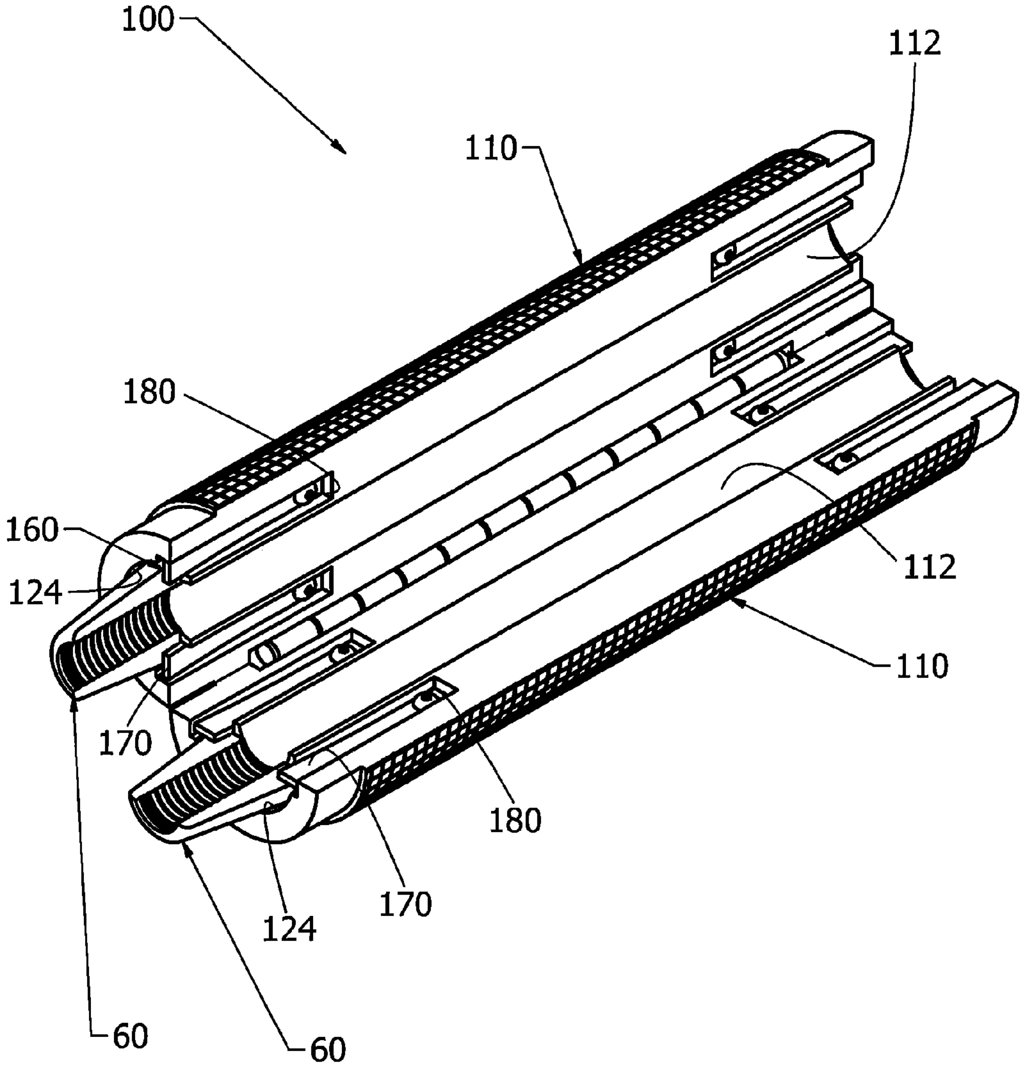
FIG. 4 illustrates a perspective view of the tool depicted in FIG. 3 with prior art wedges temporarily installed thereon.

As best shown in FIG. 4, wedge retention means 160 can be located at either or both of end portions 122 of either or both of body portions 120. Wedge retention means 160 permits prior art wedges 60 to be temporarily and removably attached to tool 100 for installation into the space that exists between the outer surface of reinforcing cable 40 and the inner surface of opening 12 in such a manner that, in a two wedge system following installation, wedges 60 are on opposite sides of cable 40 and gaps 64 exists between wedges 60 at the roughly twelve-o'clock and six-o'clock positions as best illustrated in FIG. 1A.

In a preferred embodiments of the present invention which is shown in FIG. 4, wedge retention means 160 is comprised of clips 170 that are attached to or countersunk into the interior surface 130 of body portion 120 so as to not interfere with the operation of tool 100. Clips 170 are preferably elongated plates comprised of a durable material such as AISI 1095 grade spring steel with a Rockwell hardness number of between C53 and C59, though it is contemplated that other tool grades of steel or other durable materials can also be used. Clips 170 may be countersunk and attached to interior surface 130 of body portion 120 by fasteners 180 as shown in FIG. 3. Fasteners 180 may be any type of fastener known in the art including, without limitation, screws, rivets, and the like.

As depicted in FIG. 3, each of end portions 122 may further comprise a sidewall 126 and wedge seat 128 that, together with clips 170 form an opening or pocket 124 for receipt of a prior art wedge 60. More specifically, the wider or thicker portion of a prior art tapered wedge 60 can be inserted into pocket 124 by leveraging wedge 60 to slightly deflect clips 170 away from interior surface 130 until wedge 60 is seated on wedge seat 128, where it is temporarily held in place between sidewall 126 and clips 170. Sidewall 126 and wedge seat 128 may be formed by boring into the end of elongated member 110, prior to the installation of clips 170, to a depth of between ⅛ and ½ of an inch though it is contemplated that other depths can also be used provided that, when properly installed, wedges 60 extend at least ¾ to 1 and ¼ of an inch beyond the end of tool 100 for insertion into the space formed between the exterior of cable 40 and the interior of the surrounding anchor 10, and further provided that clips 170 extend far enough into pocket 124 to temporarily grip wedges 60 as described above.

Alternatively, it is also contemplated that wedge retention means 160 could be comprised of magnets 162 in place of, or opposed to, clips 170, as shown in FIG. 3A. For example, magnets 162 could be fixedly attached to or embedded in end portions 122 (e.g., in sidewall 126 or wedge seat 128) of tool 100 for magnetically and temporarily securing wedges 60 to tool 100. The magnets 162 could be positioned at other locations on elongated member 110, provided that the particular placement of the magnets does not unduly interfere with the opening/closing or operation of tool 100. Regardless of the particular wedge retention means employed, wedge retentions means 160 are preferably located on both end portions 122 of both body portions 120 so that a total of four sets of wedges 60 can be installed without having to reload tool 100, as described more fully below.

In a preferred embodiment of the present invention, the overall length of tool 100 as measured from end to end is between 5 and 12 inches, with an outside diameter of between 1½ and 3 inches. As depicted in FIG. 2, end portions 122 may be slightly smaller in diameter than the remainder of elongated member 110 to ensure proper clearance within anchor 10 during the wedge installation process. Nonetheless, it is also contemplated that other sizes, shapes and dimensions of tool 100 can also be used without affecting the overall concept of the present invention, provided that the shape and size of tool 100 is capable of being partially inserted into anchor cavity 20, as described above. It is also contemplated that tool 100 can be rust proofed by an any means commonly known in the art to extend the overall useful life of the device and protect the same from the elements.

Having now described the preferred embodiment of tool 100, its use and usefulness will now be described. A worker (not shown) desiring to properly install and seat wedges 60 in an anchor assembly 10 of a post tensioned concrete member 30 utilizing the tool 100 of the present invention will temporarily install one or more of wedges 60 on tool 100 using one of the above described wedge retention means 160. For example, if the wedge retention means 160 is comprised of clips 170, the worker would insert the wider or thicker portion of the wedge 60 into pocket 124 by leveraging the wedge 60 to slightly deflect clips 170 away from interior surface 130 until wedge 60 is seated on wedge seat 128, where it is temporarily held in place between sidewall 126 and clips 170.

Once wedges 60 are temporarily installed on tool 100, the worker will wrap tool 100 substantially around the circumference of reinforcing cable 40 such that cable 40 is positioned within opening 112 and the tool 100 may be slidably repositioned along cable 40. In order to properly install wedges 60 into the wedge receiving space of anchor 10, tool 100 should be positioned on cable 40 such that the gaps between wedges 60 exist at the twelve-o'clock and six-o'clock positions, as previously discussed. The worker then applies a longitudinal force to tool 60 along the reinforcing cable 40 in the direction of anchor 10 to drive wedges 60 into the space formed between the exterior of cable 40 and the interior of the surrounding anchor 10.

Having installed the wedges 60 into the anchor 10, the worker then slides tool 100 along cable 40 away from the anchor 10, and again applies a longitudinal force to tool 100 along the cable 40 in the direction of anchor 10 to strike or hammer the wedges 60 and partially seat the same within anchor 10. These step may be repeated as often as needed to seat wedges 60, and can be performed using a single hand. After the wedges 60 are installed and partially seated in anchor 10, a hydraulic jack or ram (not shown) pulls or stresses cable 40 in a direction away from concrete member 30, while also further seating the wedges 60 in anchor assembly 10. Once all of the cables 40 have been properly stressed, the ends of cables 40 are cut, the anchor cavities 20 are grouted, and the ends of the concrete member 30 are encapsulated to protect cables 40 from the elements.

As previously stated, in a preferred embodiment of the present invention, wedge retentions means 160 are located on both end portions 122 of both body portions 120 so that a total of four pairs of wedges 60 can be quickly and easily installed without having to reload tool 100. More specifically, the worker can load a pair of wedges 60 into wedge retention means 160 located on both ends of tool 100, and first complete the above referenced steps to install and seat the wedges 60 located on the first end of tool 100. The worker can then flip the tool 100 over in his hand and proceed to complete the above referenced steps to install and seat the wedges 60 located on the second end of tool 100. Therefore, it should be readily apparent to those of ordinary skill in the art that the tool 100 of the present invention presents a new and novel way of installing and seating wedges 60 in an anchor assembly 10 of a post tensioned concrete member 30.

Additionally, other variations are within the spirit of the present invention. For example, it is also contemplated that the tool of the present invention could be constructed of other materials, and/or could also be modified to accommodate a three wedge system without affecting the overall concept of the present invention. Stated differently, one or ordinary skill in the art will appreciate that one of body portions 120 could be structured to temporarily hold two of the three wedges 60 in a three wedge system, while the other body portion 120 would hold the third wedge 60 for installation. Alternatively, it is contemplated that elongated member 110 could be comprised of three body portions 120 hingedly attached to one another, with each body member 120 holding a wedge 60. Therefore, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms “a” and “an” and “the” and similar referents in the context of describing the invention (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term “connected” is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tool comprising:

an elongated member comprised of more than one body portions hingedly attached together, a first end and a second end, wherein said elongated member has a continuous opening therein for receipt of a reinforcing cable; and a wedge retention means located on at least one of said first end or said second end for temporarily attaching at least one wedge to the tool until such time that said at least one wedge is installed in a space between an anchor and the reinforcing cable extending through said anchor; wherein said wedge retention means is comprised of at least one removably attachable clip.

2. The tool of claim 1 wherein said elongated member further comprises an outer surface with a handle portion.

3. The tool of claim 1 further comprising at least one pocket for receipt of a wedge, wherein said pocket is formed by a sidewall, a wedge seat and said wedge retention means.

4. The tool of claim 1, wherein said wedge retention means is further comprised of a magnet.

5. The tool of claim 1, wherein said tool is comprised of a metal.

6. The tool of claim 1, wherein said at least one removably attachable clip is comprised of a metal.

7. A tool comprising:

an elongated member with a continuous opening therein for receipt of a reinforcing cable extending through an anchor, wherein said elongated member further comprises two body portions, a hinge, a first end and a second end; wherein at least one of said two body portions further comprises at least one pocket for receipt of a wedge; and a wedge retention means located on at least one of said first or second ends for temporarily retaining the wedge until said wedge is securely positioned in a space between said anchor and said reinforcing cable, wherein said at least one pocket is formed by a sidewall, a wedge seat and said wedge retention means.

8. The tool of claim 7 wherein said elongated member is further comprised of two body portions hingedly attached to each other by said hinge.

9. The tool of claim 7 wherein said wedge retention means is comprised of at least one clip.

10. The tool of claim 7 wherein said elongated member further comprises an outer surface with a handle portion.

11. The tool of claim 7, wherein said wedge retention means is a magnet.

12. The tool of claim 7, wherein said tool is comprised of a metal.

13. The tool of claim 9, wherein said at least one clip is comprised of a metal.

* * * * *